US009681323B2

(12) United States Patent
Horn et al.

(10) Patent No.: US 9,681,323 B2
(45) Date of Patent: Jun. 13, 2017

(54) CONNECTED MODE NETWORK SELECTION IN WLAN-CELLULAR INTERWORKED NETWORKS

(71) Applicant: QUALCOMM Incorporated, San Diego, CA (US)

(72) Inventors: Gavin Bernard Horn, La Jolla, CA (US); Arnaud Meylan, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 14/265,232

(22) Filed: Apr. 29, 2014

(65) Prior Publication Data
US 2014/0328193 A1 Nov. 6, 2014

Related U.S. Application Data

(60) Provisional application No. 61/818,414, filed on May 1, 2013.

(51) Int. Cl.
*H04W 24/10* (2009.01)
*H04W 24/00* (2009.01)
*H04W 88/06* (2009.01)
*H04W 48/16* (2009.01)

(52) U.S. Cl.
CPC ......... *H04W 24/10* (2013.01); *H04W 24/00* (2013.01); *H04W 48/16* (2013.01); *H04W 88/06* (2013.01)

(58) Field of Classification Search
None
See application file for complete search history.

(56) References Cited

U.S. PATENT DOCUMENTS

| 2008/0198811 | A1 | 8/2008 | Deshpande et al. | |
| 2010/0271966 | A1* | 10/2010 | Hirano et al. | 370/252 |
| 2011/0237246 | A1 | 9/2011 | Sen | |
| 2014/0293829 | A1* | 10/2014 | Visuri et al. | 370/254 |

OTHER PUBLICATIONS

Ericsson, "Connected mode access selection solution for WLAN/3GPP radio interworking" 3GPP Draft; R2-131389, Apr. 6, 2013.*

(Continued)

*Primary Examiner* — Robert M Morlan
(74) *Attorney, Agent, or Firm* — Harrity & Harrity, LLP

(57) ABSTRACT

A method for network selection in a cellular and WLAN interworked network may include determining, by a UE, an association state between the UE and a WLAN access point. The UE may select a metric of the access point, based at least in part on the determined association state. The UE may determine a value of the metric. The UE may determine whether to report the value of the metric to a base station of the cellular wireless network, based on various factors. These factors may include the association state, the value of the at least one metric relative to a threshold value, a change in the association state, or receiving a reporting instruction from the base station. The UE may report the value of the metric to a base station, based on its determination. A base station may perform operations complementary to the UE, for network selection.

23 Claims, 13 Drawing Sheets

(56) References Cited

OTHER PUBLICATIONS

Qualcomm, "Requirements for network selection mechanisms for WLAN/3GPP interworking" 3GPP Draft, R2-131157, Apr. 4, 2013.*
Broadcom, "Air-Interface Enhancement Proposals for WLAN/3GPP Radio Interworking" 3GPP Draft, R2-131384, Apr. 5, 2013.*
Qualcomm, "Benefits of UE reporting for WLAN interworking in Solution 3", 3GPP Draft, R2-133102, Sep. 28, 2013.*
CATT: "Network Selection Policy Based on QoS", 3GPP Draft, R2-130969, 3rd Generation Partnership Project (3GPP), Mobile Competence Centre, 650, Route Des Lucioles, F-06921 Sophia-Antipolis Cedex, France, vol. RAN WG2, No. Chicago, USA, Apr. 15, 2013-Apr. 19, 2013, Apr. 4, 2013 (Apr. 4, 2013), XP050699125, 2 pages. Retrieved from the Internet: URL:http://www.3gpp.org/ftpjtsg ran/WG2 RL2/TSGR2 81bis/Docs/.
International Search Report and Written Opinion—PCT/US2014/036263—ISA/EPO—Oct. 27, 2014.
Partial International Search Report—PCT/US2014/036263—ISA/EPO—Sep. 8, 2014.

* cited by examiner

CONNECTED MODE NETWORK SELECTION IN WLAN-CELLULAR INTERWORKED NETWORKS

CROSS-REFERENCE TO RELATED APPLICATION

The present application claims priority under 35 U.S.C. §119(e) to U.S. provisional application Ser. No. 61/818,414 filed May 1, 2013, which application is incorporated by reference herein, in its entirety.

FIELD

Certain aspects of the present disclosure generally relate to wireless communications and, more particularly, to techniques for connected-mode network selection in a cellular (e.g., 3GPP) and wireless local area (WLAN) interworked network.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems. Such selection capabilities may raise new issues and challenges pertinent to system selection by a terminal.

SUMMARY

Methods, apparatus and systems for connected-mode network selection in a cellular and WLAN interworked network are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for network selection in a cellular and WLAN interworked network comprising a cellular wireless network and a WLAN may include determining, by a UE, an association state between the UE and a WLAN access point. The method may further include selecting at least one metric of the access point, based at least in part on the association state, and determining a value of the at least one metric. The method may further include the UE determining whether to report the value of the at least one metric to a base station of the cellular wireless network, based various factors. The various factors may include at least one of: the association state, the value of the at least one metric relative to a threshold value, a change in the association state, or receiving a reporting instruction from the base station. The method may further include the UE reporting the value of the at least one metric to a base station of the cellular wireless network, based on the determining whether to report.

In another aspect, the method may include the UE receiving a message from the base station in response to the reporting. The message may include at least one of: an allocation or re-allocation of UE traffic between the WLAN access point and the base station, or an indication of one or more of the at least one metric to be determined by the UE.

In further aspects of the method, the selecting operation may include selecting the at least one metric from one of at least two distinct sets of metrics. For example, the selecting may include selecting the at least one metric from a first one of the distinct sets based on the UE being in an associated state with the WLAN access point, and selecting the at least one metric from a second one of the distinct sets based on the UE being in an unassociated state with the WLAN access point. For further example, the selecting may include selecting the at least one metric from a first one of the distinct sets based on the UE being in an active connection with the WLAN access point, and selecting the at least one metric from a second one of the distinct sets based on the UE being in an non-active connection with the WLAN access point. A non-active connection may include one of unassociated with the AP, associated with the AP but not sending data, or associated with the AP but not sending data above a threshold (i.e., too low throughput).

In further related aspects of the method, members of the first one of the distinct sets may indicate a quality or bandwidth of a connection between the UE and the access point. For example, the first one of the distinct sets may include any one or more of: an over-the-air (OTA) bit rate, a frame error rate (FER), OTA throughput, uplink buffer size, uplink latency, media access control (MAC) management information base (MIB) counter, 802.11 report, or backoff counter value.

Likewise, members of the second one of the distinct sets may indicate a quality of a signal from the WLAN access point measured by the UE, a service load on the WLAN access point, or a capability of the WLAN access point. For example, the second one of the distinct sets may include any one or more of: received channel power indicator (RCPI), received signal to noise indicator (RSNI), basic service set (BSS) load, a number of stations associated with the WLAN access point, a number of effective users using the access point, or an average number of stations associated with the access point with buffered traffic. In an alternative, or in addition, the second one of the distinct sets may includes any one or more of: a beacon loss rate, a wide area network (WAN) metric, a physical layer rate, an available bandwidth, an average backoff time, a traffic indication map interval, or an 802.11 capability.

In another aspect, a method for wireless communication in a network comprising a cellular wireless network and a wireless local area network (WLAN) may be performed by a base station of the cellular wireless network in communication with a user equipment (UE). The method by the base station may include receiving information indicating an association state between the UE and a WLAN access point, and instructing the UE to report at least one metric of the access point, based at least in part on the association state. The operation instructing the UE to report the value of the at least one metric may include a condition based on at least one of: the association state, the value of the at least one metric relative to a threshold value, or a change in the association state. The method may further include the base station receiving a value of the at least one metric from the UE, responsive to the instructing.

In another aspect, the method may include the base station providing a message to the UE in response to the receiving the value. The message may include at least one of: an allocation or re-allocation of UE traffic between the WLAN access point and the base station, or an indication of one or more of the at least one metric to be determined by the UE.

In another aspect, the instructing operation may include providing an instruction for selecting the at least one metric from one of at least two distinct sets of metrics. For example, the instructing may include providing an instruction for selecting the at least one metric from a first one of the distinct sets based on the UE being in an associated state with the WLAN access point. The method may further include selecting the at least one metric from a second one of the distinct sets based on the UE being in an unassociated state with the WLAN access point.

In an aspect, members of the first one of the distinct sets may indicate a quality or bandwidth of a connection between the UE and the access point. In another aspect, members of the second one of the distinct sets may indicate a quality of a signal from the WLAN access point measured by the UE, a service load on the WLAN access point, or a capability of the WLAN access point.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a UU or other mobile entity, or an access point (small cell or macro cell) of a wireless communication network. Similarly, an article of manufacture may be provided, including a computer-readable storage medium holding encoded instructions, which when executed by a processor, cause a UE or network entity to perform the methods and aspects of the methods as summarized above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates a methodology for managing UE determination and reporting of a metric for a WLAN, for performance by a UE or the like.

FIG. 12 illustrates a methodology for managing UE reporting of a metric for a WLAN, for performance by a base station or the like.

DETAILED DESCRIPTION

Figure 1:
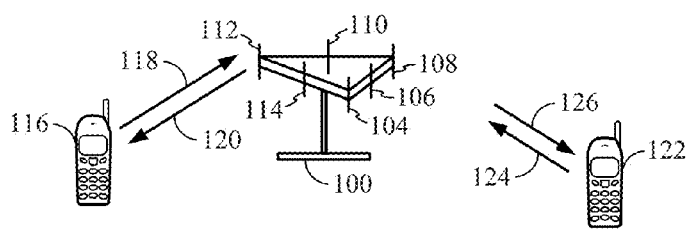
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated in which procedures described for reducing the time to begin acquisition of wireless networks may be performed. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
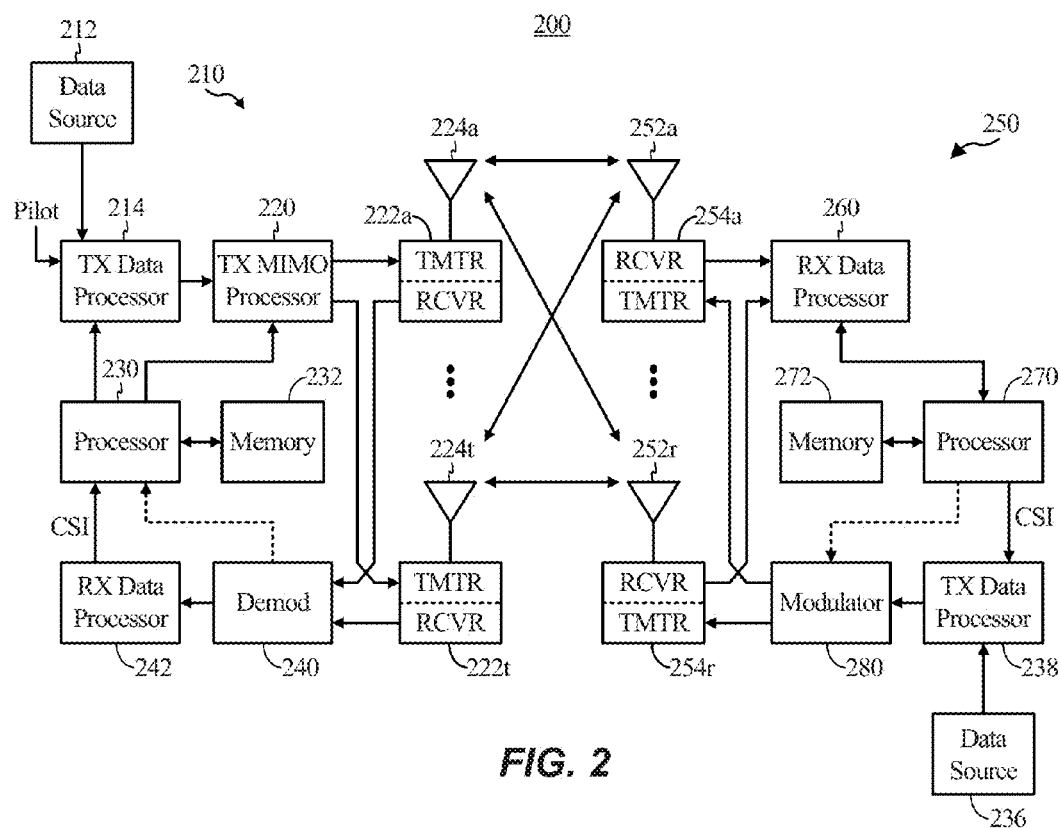
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
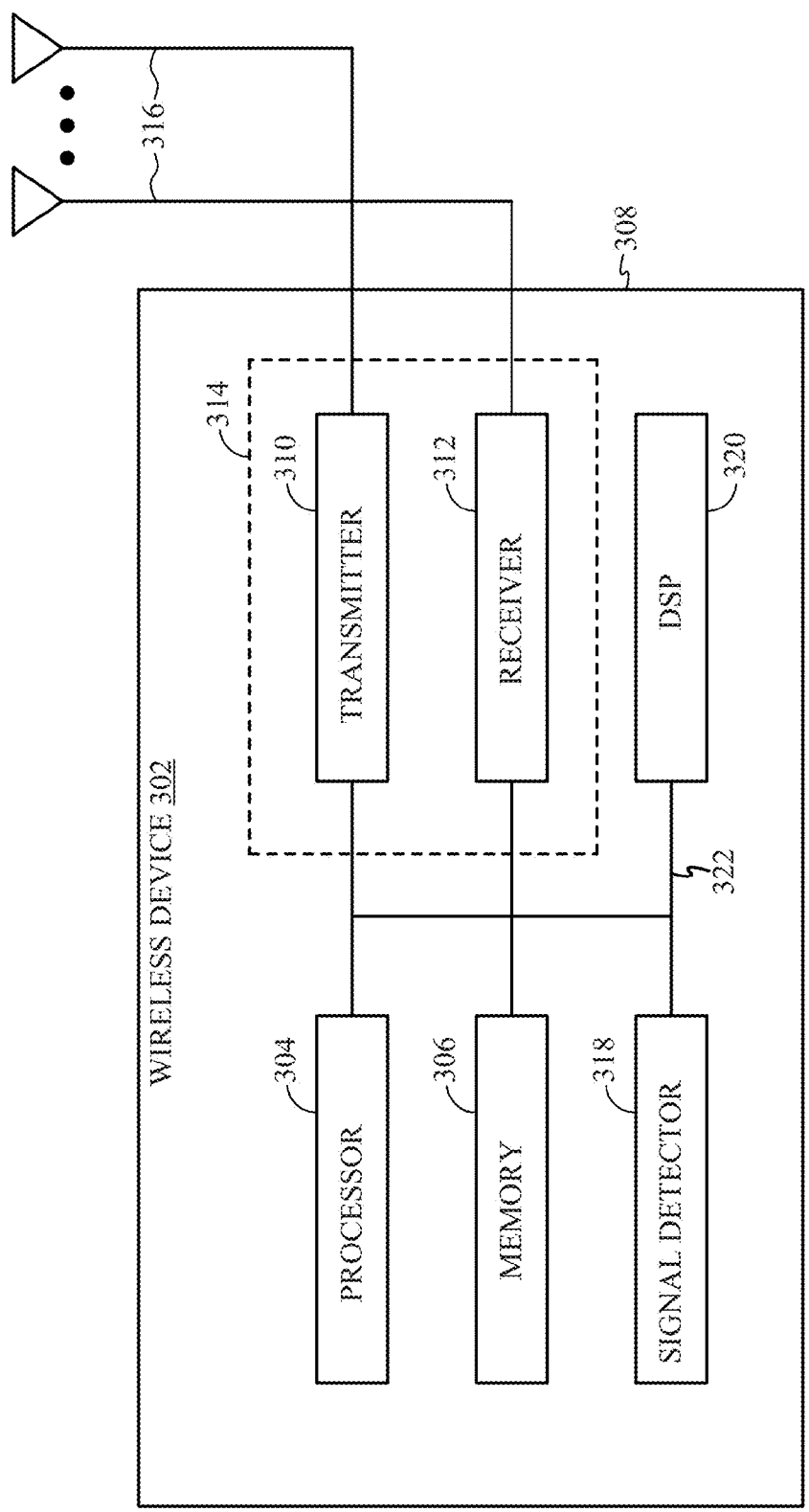
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
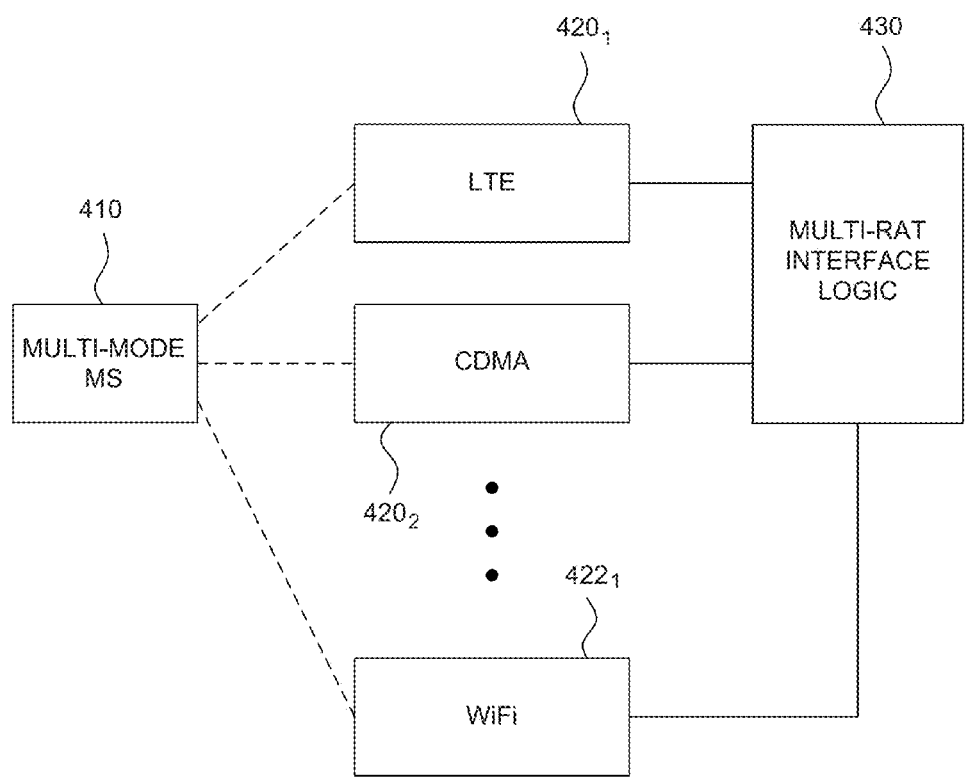
FIG. 4 illustrates an example multi-mode mobile station, in accordance with certain aspects of the present disclosure.

In order to expand the services available to subscribers, some MSs may support communications with multiple radio access technologies (RATs). For example, as illustrated in FIG. 4, a multi-mode mobile station (MS) 410 may support LTE for broadband data services and code division multiple access (CDMA) for voice services. Illustratively, LTE is shown as a first RAT $420_1$, CDMA is shown as a second RAT $420_2$, and Wi-Fi is shown as a third RAT $422_1$).

In certain applications, multi-RAT interface logic 430 may be used to exchange information between both long-range and short-range RATs. This may enable a network provider to control how (through which RAT) an end user of the multi-mode MS 410 actually connects to the network. The interface logic 430 may, for example, support local IP connectivity or IP connectivity to a core network.

For example, a network provider may be able to direct the multi-mode MS to connect to the network via short-range RAT, when available. This capability may allow a network provider to route traffic in a manner that eases congestion of particular air resources. In effect, the network provider may use short-range RATs to distribute some air traffic (of a long-range RAT) into a wireline network or to distribute some air traffic from a congested wireless network to a less congested wireless network. The traffic may be re-routed from the short-range RAT when conditions mandate, such as when a mobile user increases speed to a certain level not suitable for a short-range RAT.

Further, since long-range RATs are typically designed to provide service over several kilometers, the power consumption of transmissions from a multi-mode MS when using a long-range RAT is non-trivial. In contrast, short-range RATs (e.g., Wi-Fi) are designed to provide service over several hundred meters. Accordingly, utilizing a short-range RAT when available may result in less power consumption by the multi-mode MS 410 and, consequently, longer battery life.

Network Selection and Measurement Reporting in an Interworked Environment

Figure 5:
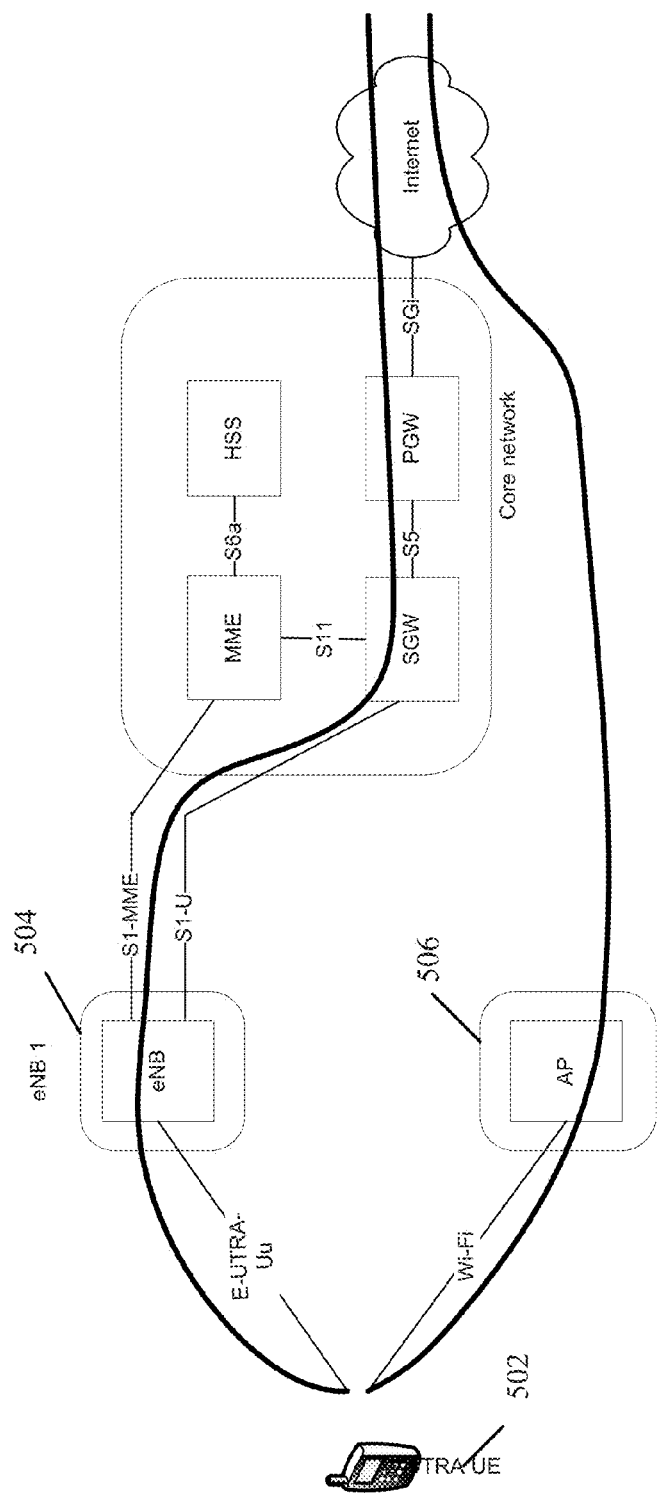
FIG. 5 illustrates an example architecture for a wireless local area network (WLAN) and a 3GPP access interworking with non seamless mobility.

FIG. 5 illustrates an example architecture for a wireless local area network (WLAN) and a 3GPP access interworking with non-seamless mobility. In such an architecture, a user equipment (UE) 502 may use different Internet protocol (IP) addresses at eNB 1 504 and WLAN AP 506.

The UE 502 may use separate packet data network (PDN) connections. The data planes for WLAN and 3GPP are essentially independent, and there is no session continuity (e.g., mobility support for the WLAN). In other words, the UE 502 may find a WLAN AP independently (e.g., with no assistance from the 3GPP network), which may be inefficient.

Certain aspects of the present disclosure, however, provide techniques for a cellular network controlling a UE accessing and offloading traffic to a WLAN. In this manner, a UE may become aware of WLAN APs by performing scanning procedures as specified in 802.11, which generally includes passive scanning and active scanning.

Passive scanning, as defined in 802.11, may be inefficient for the UE, as it must wait, with receiver on, for the reception of a WLAN beacon. As the beacon transmission interval is on the order of a hundred milliseconds, this may result in high scan energy and high scan latency with dozens of channels to scan. Active scanning may be faster, but adds traffic to the WLAN, namely probe requests and probe responses. Active scanning is also power intensive.

Some standards (e.g., 802.11u) have defined additional mechanisms for a UE to discover further information about an AP without being associated with the AP. For example, a generic advertisement service (GAS) may provide a transport of an advertisement protocol's frames between the UE and a server in the network. In this scenario, the AP may be responsible for the relay of a mobile device's query to a server in the carrier's network and for delivering the server's response back to the mobile.

An example of another mechanism includes access network query protocol (ANQP), which is generally a query advertisement protocol for access network information retrieval by the UE/STA from the AP which is transported over the GAS, including a Hotspot operator's domain name, roaming partners accessible via the Hotspot along with their credential type and EAP method supported for authentication, IP address type availability, and other metadata useful in the UE's network selection process.

A UE may not have to associate with a WLAN AP in order to provide measurements. The UE may support a subset of additional procedures as defined in 802.11k, 802.11u and Hotspot 2.0.

With regards to a radio access network (RAN), there may be no interface between the AP and the BS, as illustrated in FIG. 5. Even though this is expected to operate for operator controlled WLAN APs, no loading or neighbor information is expected to be exchanged over the backhaul. However, in the case of a collocated AP and BS, 802.11k, 802.11u, and Hotspot 2.0 information on the AP may be known in the BS (e.g., via a backhaul link) and the UE may not be required to perform ANQP to acquire the information.

When efficient passive scanning is enabled, the AP may transmit its beacons at the time advertised by the RAN. In other words, the AP may be required to acquire cellular timing and SFN, and know beacon transmission times advertised by the RAN. For certain aspects, two levels of reporting may be required to identify the AP: identifying the AP (e.g., based on BSSID), i.e., from beacon only, and providing 802.11k, 802.11u, or Hotspot 2.0 identifying information using ANQP (e.g., in the case of a non-collocated AP and eNB). For certain aspects, it is possible to have a backhaul interface to exchange this information not shown in the figure).

Figure 6:
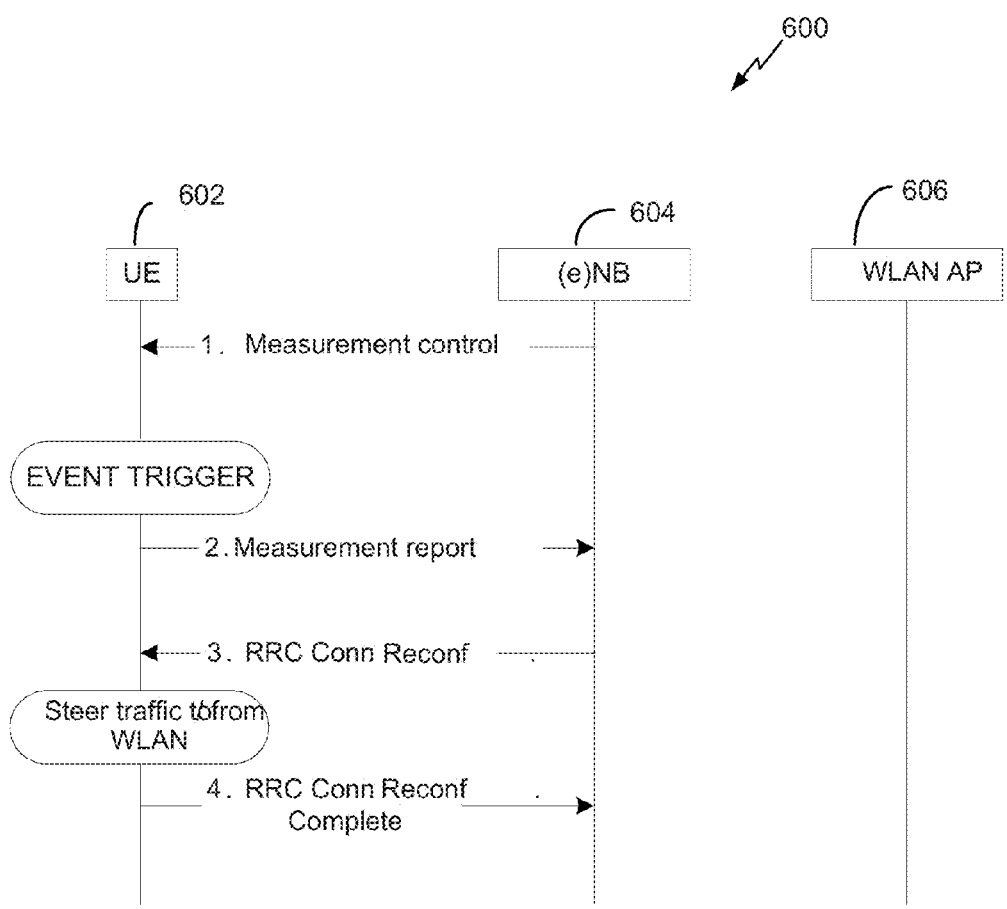
FIG. 6 illustrates example RF measurement control procedures in a cellular/WLAN internetworked environment, in accordance with certain aspects of the present disclosure.

In section 6.2.3 of 3GPP TR 37.834[1] concerning WLAN/3GPP interworking, traffic steering for UEs in RRC CONNECTED/CELL_DCH state is controlled by the network using dedicated traffic steering commands, potentially based also on WLAN measurements. The present application presents details for the traffic steering for UEs in RRC CONNECTED/CELL_DCH state and shows the application to the use cases defined in 3GPP TR 37.834[1]:

A. UE is within UTRAN/E-UTRAN coverage, is using 3GPP and goes into WLAN AP coverage B. UE is within UTRAN/E-UTRAN and WLAN coverage, is using WLAN and goes out of WLAN AP coverage C. UE is within the coverage area of both, UE using WLAN, all or a subset of the UE's traffic should be routed via UTRAN/E-UTRAN instead D. UE is within the coverage area of both, UE using UTRAN/E-UTRAN, all or a subset of the UE's traffic should be routed via WLAN instead E. UE using both accesses and should be connected to only one (WLAN or UTRAN/E-UTRAN) or some traffic should be moved to the other access FIG. 6 illustrates traffic steering 600 for UEs in RRC CONNECTED/CELL_DCH state. Building on the principles defined for mobility management in RRC CONNECTED/CELL_DCH, the traffic steering comprises the following steps as shown in FIG. 6:

1. Measurement control: The (e)NB 604 configures the UE measurement procedures including the identity of the target WLAN 606 to be measured. As used herein, "(e)NB" signifies an eNB or a NodeB (NB).

2. Measurement report: The UE 602 is triggered to send MEASUREMENT REPORT by the rules set by the measurement control.

3. Traffic steering: The (e)NB sends the RRC RRCConnectionReconfiguration message to the UE to perform the traffic steering.

For measurement control, the following types of information may be defined for configuring the UE to measure the operator WLAN:

1. Measurement events to trigger reporting
2. Target identification

3. Measurements to make (see section 3.2 measurements to report)

Based on the measurement events defined in TS 36.331 and TS 25.331, Table 1 shows the candidate measurement events for WLAN:

TABLE 1

| Event | Description |
|---|---|
| W1 | WLAN becomes better than a threshold (to trigger traffic steering to WLAN) |
| W2 | WLAN becomes worse than a threshold (to trigger traffic steering from WLAN) |

NOTE: The thresholds are based on the values of the measurements to report. These values may be defined as described herein below. Target identification may be used to indicate to the UE which WLAN to consider for the measurement control procedures including the target WLAN ID and the operating channels to search for.

Table 2 shows the candidate target identifiers for WLAN:

TABLE 2

| Identifier | Description | Availability in WLAN |
|---|---|---|
| BSSID | Basic service set identifier. For infrastructure BSS, the BSSID is the MAC address of the wireless access point | Beacon or Probe Response |
| SSID | Service Set Identifier. The SSID can be used in multiple, possibly overlapping, BSSs | Beacon or Probe Response |
| HESSID | Homogeneous Extended Service Set Identifier. A MAC address whose value shall be configured by the Hotspot Operator with the same value as the BSSID of one of the APs in the network. All APs in the wireless network shall be configured with the same HESSID value. | Beacon or Probe Response (802.11u) |
| Domain Name List | Domain Name list element provides a list of one or more domain names of the entity operating the WLAN access network. | ANQP (HS 2.0) |
| Operating class, channel number | Indication of the target WLAN frequency. See Annex E of 802.11 for definitions of the different operating classes | N/A |

Table 3 shows the candidate measurements to report for WLAN when the UE is not associated:

TABLE 3

| Identifier | Description | Availability in WLAN |
|---|---|---|
| RCPI | Received Channel Power Indicator (equivalent to RSRP in LTE) Measure of the received RF power in the selected channel for a received frame in the range of −110 to 0 dBm | Measurement |
| RSNI | Received Signal to Noise Indicator (equivalent to RSRQ in LTE) An indication of the signal to noise plus interference ratio of a received IEEE 802.11 frame Defined by the ratio of the received signal power (RCPI-ANPI) to the noise plus interference power (ANPI) in steps of 0.5 dB in the range from −10 dB to +117 dB | Measurement |

TABLE 3-continued

| Identifier | Description | Availability in WLAN |
|---|---|---|
| BSS Load | counting STA with buffered traffic indicated in the beacon Traffic Indication Map (TIM) | Beacon or Probe Response (802.11k) |
| Nassoc | Number of STAs associated with this access point or on this channel (across APs) | |
| Neff | Number of effective (active) users on this this access point or on this channel | |
| Nbuff | Counting average number of STA with buffered traffic indicated in the beacon Traffic Indication Map (TIM) | Measurement, |
| Beacon loss rate | The ratio of beacons the STA does not receive successfully | |
| WAN metrics | Includes estimates of DL and UL backhaul speeds and loading as well as link status and whether the WLAN AP is at capacity. | ANQP (HS 2.0) |
| PHY rates | The STAs best estimate of what UL and DL physical layer rate are possible | |
| Available bandwidth | The STAs best estimate of the UL and DL available bandwidth. UE may use estimates of phy rates, error rates, channel load to compute | |
| ABT | Average backoff time: average time measured from when data enters the transmitter until the transmitter performs the first transmission. Includes deferred time due to channel busy and deferred time due to CSMA backoff. In idle mode the STA can perform the measurement as if it had a packet, but not transmit anything. | |
| TII | Traffic Indication Map Interval. Relates to how much power the STA will use on standby on that AP | |
| Capabilities | Any of the capabilities defined in 802.11 or WFA. Examples QoS, Power Management, Block Ack | |

Table 4 shows the candidate measurements to report for WLAN when the UE is associated to the WLAN.

TABLE 4

| Identifier | Description |
|---|---|
| MCS | Modulation and coding scheme - average OTA bit rate achieved when transmitting. For uplink and downlink |
| FER | Frame error rate. For uplink and/or downlink. Could be measured at the physical layer (fraction of frames where CRC fails) or above the MAC layer (fraction of remaining lost frames after ARQ process). Remark: DL FER could also be inferred by the UE using FCS error counters, or by observing gaps in the WLAN sequence numbers. |
| Throughput | Achieved OTA throughput (possibly per QoS access class or QCI) |
| Buffer size | Max or Avg buffer size at the UE on the UL (possibly per QoS access class or QCI) |
| Latency | Max or Avg latency to deliver a packet by the UE on the UL (possibly per QoS access class or QCI) |
| MAC MIB | Any of the MAC MIB counters defined in 802.11 |
| 802.11k reports | Any of the quantities that 802.11k can report, for instance TransmittedCount: The number of MAC PDU successfully transmitted by STA FailedCount: The number of MAC PDU whose transmission failed: they were transmitted the maximum number of times and Ack was not received. RetryCount: The number of packets that were successfully transmitted with at least one retry MultipleRetryCount: The number of packets that were |

TABLE 4-continued

| Identifier | Description |
| --- | --- |
| | successfully transmitted with at least two retries
AckFailure: Incremented when STA sends a frame and does not receive Ack
Remark: While raw FER conveys the quality of the link to a good extent, different UEs may have different retry policies and different number of maximum attempts. They may also adapt the rate differently for the different attempts of the same frame. The retry and loss rate will quantify the effective link quality seen by the IP layer after accounting for the MAC layer implementation differences |
| Backoff counter stats | The backoff counter value is an indicator of load, i.e., more load will cause the STA to backoff more
+all the items of Table 3 |

Table 5 shows the candidates for identifying the traffic to steer to or from WLAN.

TABLE 5

| Event | Description |
| --- | --- |
| LC ID | Logical channel ID of a radio bearer |
| QCI | QoS Class Identifier |
| APN | Access Point name |
| TFT | Traffic flow template |

Applicability to the Use Cases Defined in 3GPP Technical Report (TR) 37.834:

A. If UE is within UTRAN/E-UTRAN coverage, is using 3GPP and goes into WLAN AP coverage:
  Measurement control: (e)NB configures UE to report one or more WLAN APs when the UE moves into coverage, e.g., using event W1 with RSNI above a threshold
  Measurement event: UE detects WLAN AP, event triggers and UE reports the measurement
  Traffic steering: (e)NB steers some or all the traffic to WLAN, e.g, best effort QCI 9.

B. If UE is within UTRAN/E-UTRAN and WLAN coverage, is using WLAN and goes out of WLAN AP coverage:
  Measurement control: (e)NB configures UE to report one or more WLAN APs when the UE goes out of coverage, e.g., using event W2 with RCPI below a threshold
  Measurement event: Event triggers and UE reports the measurement
  Traffic steering: (e)NB steers all traffic back to WLAN C. If UE is within the coverage area of both, UE using WLAN, all or a subset of the UE's traffic should be routed via UTRAN/E-UTRAN instead:
  Measurement control: (e)NB configures UE to report when the WLAN goes above a threshold, e.g., using event W1 with BSS load above a threshold
  Measurement event: Event triggers and UE reports the measurement
  Traffic steering: (e)NB steers some or all traffic to UTRAN/E-UTRAN, e.g., high QoS traffic QCI 1

D. If UE is within the coverage area of both, UE using UTRAN/E-UTRAN, all or a subset of the UE's traffic should be routed via WLAN instead:
  Measurement control: (e)NB configures UE to report when the WLAN goes below a threshold, e.g., using event W2 with BSS load below a threshold
  Measurement event: Event triggers and UE reports the measurement
  Traffic steering: (e)NB steers some or all traffic to WLAN, e.g., video streaming QCI 6

E. UE using both accesses and should be connected to only one (WLAN or UTRAN/E-UTRAN) or some traffic should be moved to the other access.

In view of exemplary systems shown and described herein, methodologies that may be implemented in accordance with the disclosed subject matter, will be better appreciated with reference to various flow charts. Methodologies are shown and described as a series of acts/blocks, and the number or order of blocks does not limit the claimed subject matter. Some blocks may occur in different orders and/or at substantially the same time with other blocks from what is depicted and described herein. Moreover, not all illustrated blocks may be required to implement methodologies described herein. Functionality associated with blocks may be implemented by software, hardware, a combination thereof or any other suitable means (e.g., device, system, process, or component). Additionally, methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
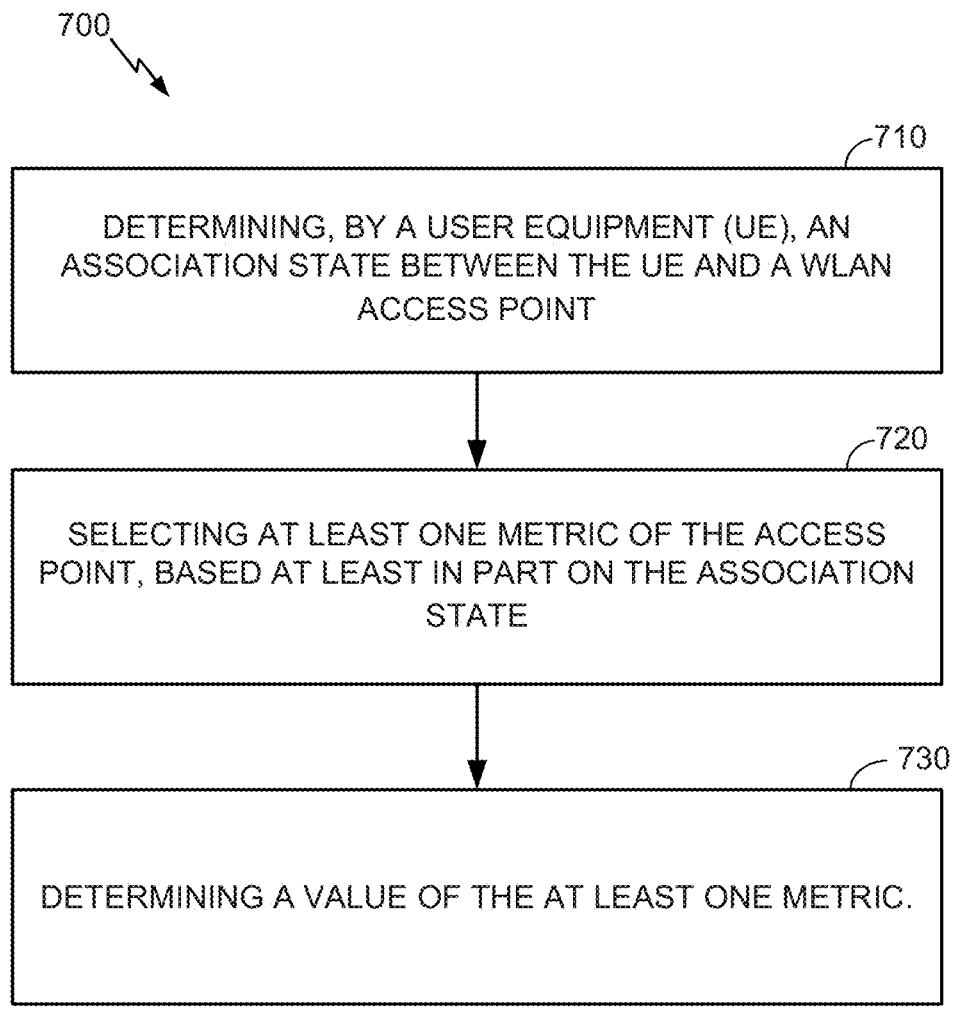

In accordance with one or more aspects of the embodiments described herein, with reference to FIG. 7, there is shown a methodology 700, operable by a wireless device (e.g., mobile entity, a UE, access terminal, or the like) for managing measurement of WLAN parameters. Specifically, the method 700 may include, at 710, determining, by a user equipment (UE), an association state between the UE and a WLAN access point. An "association state" refers to whether or not the UE is wirelessly connected to the WLAN access point. If the UE and WLAN are connected (e.g., in wireless communication with one another) then these devices are in an associated state. If not, the devices are in an unassociated state. "Determining an association state" may include, for example, detecting which of multiple possible association states the UE is currently in. Possible association states may include, for example, an associated state, an unassociated state, and other states as described herein.

The method 700 may further include, at 720, selecting at least one metric of the access point, based at least in part on the association state. For example, the UE may determine which metric or metrics to select, depending on the association state. The method 700 may further include, at 730, determining a value of the at least one metric. For example, the UE may measure a signal from the UE if in an unassociated state; or if in an associated state with the WLAN, may request metric information from the WLAN.

FIGS. 8-12 show further optional operations or aspects 800-1200 that may be performed by the base station in conjunction with the method 700 for operation by a mobile entity of a wireless communications system. The operations shown in FIGS. 8-12 are not required to perform the method 700. Operations 800-1200 are independently performed and generally not mutually exclusive unless positioned on opposing branches from a block. Any one of such independent and not mutually exclusive operations may be performed regardless of whether another downstream or upstream operation is performed. If the method 700 includes at least one operation of FIGS. 800-1200, then the method 700 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Figure 8:
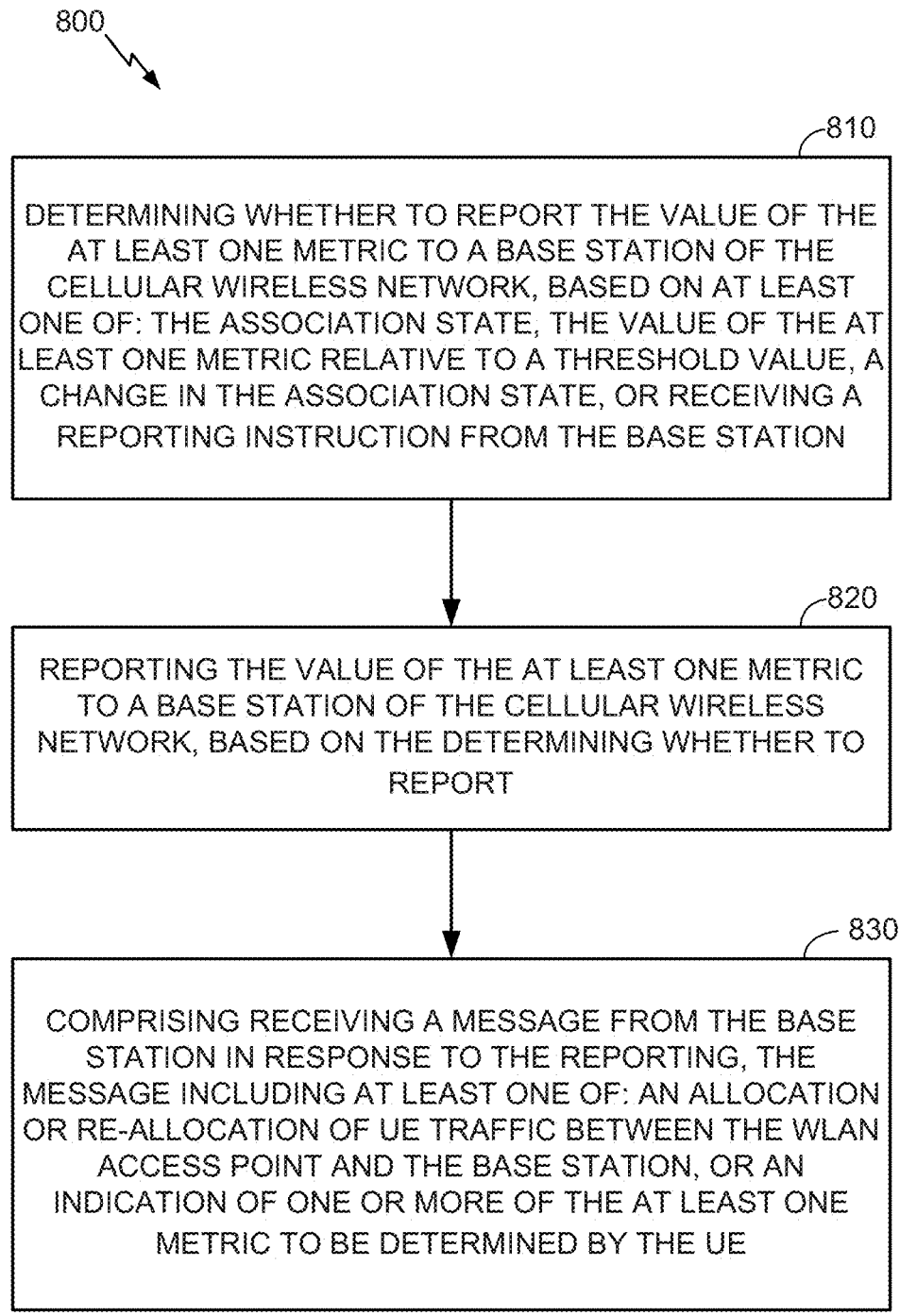
FIGS. 8-10 illustrate additional operations that may be included in the methodology illustrated by FIG. 7.

Referring to FIG. 8, the method 700 may include one or more of the additional operations 800. For example, the method 700 may further include, at 810, determining whether to report the value of the at least one metric to a base station of the cellular wireless network, based on at least one of: the association state, the value of the at least one metric relative to a threshold value, a change in the association state, or receiving a reporting instruction from the base station. The method 700 may further include, at 820, reporting the value of the at least one metric to a base station of the cellular wireless network, based on the determining whether to report. The method 700 may further include, at 830, receiving the message from the base station in response to the reporting, wherein the message includes at least one of: an allocation or re-allocation of UE traffic between the WLAN access point and the base station, or an indication of one or more of the at least one metric to be determined by the UE. In the alternative, or in addition, the UE may select one or more metric for reporting without receiving an instruction from the base station.

Figure 9:
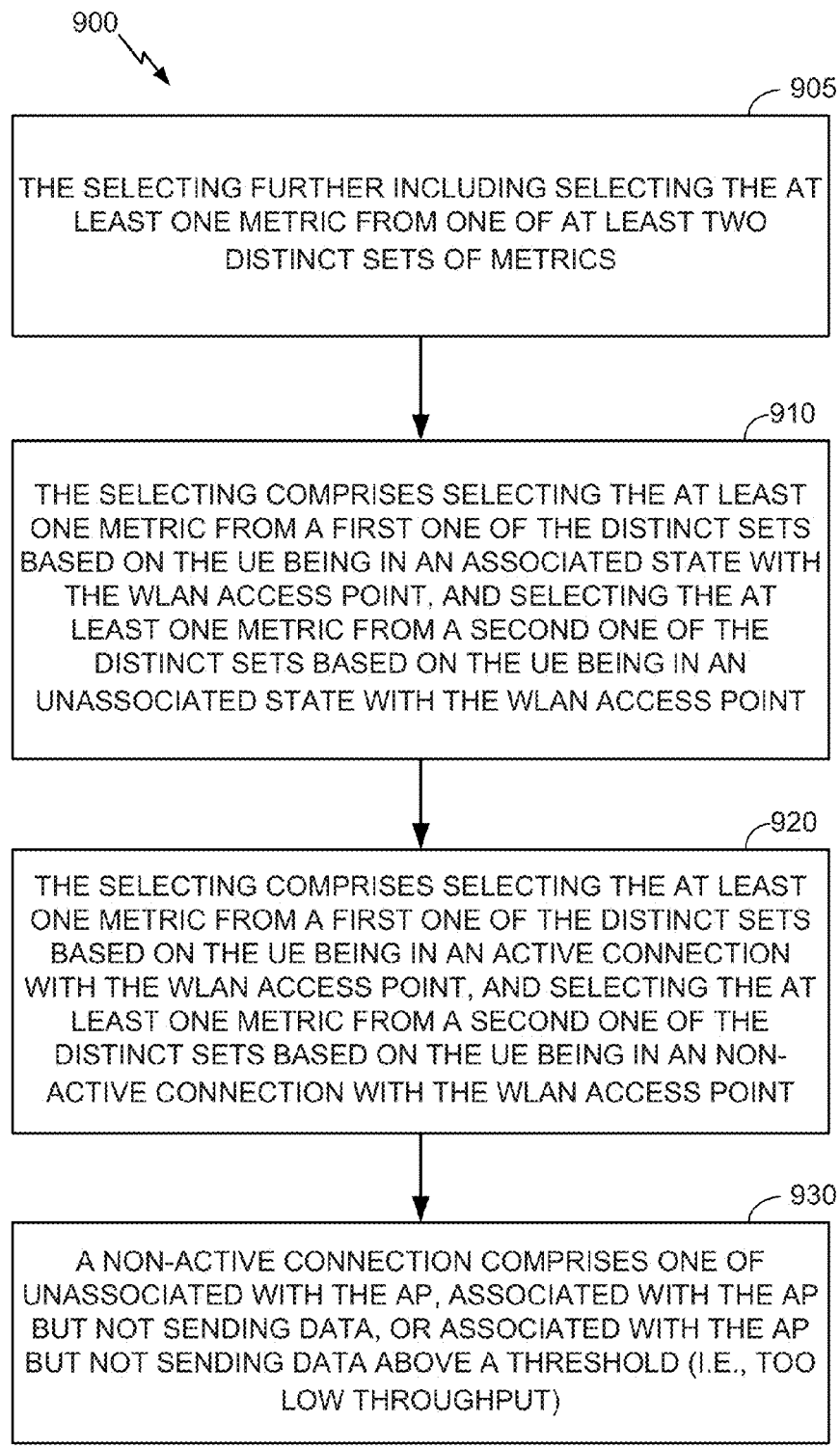

Referring to FIG. 9, the method 700 may include one or more of the additional operations 900. For example, the method 700 may further include, at 905, making the selection of the at least one metric from one of at least two distinct sets of metrics. Examples of distinct metric sets for different association states are provided herein. As used herein, "distinct sets" means that the sets each include a least one unique element that is not found in its counterpart metric sets. The sets of metrics may optionally include one or more common elements in both sets.

More particularly and for further example, the method 700 may include, at 910, making the selection of the at least one metric from a first one of the distinct sets based on the UE being in an associated state with the WLAN access point, and selecting the at least one metric from a second one of the distinct sets based on the UE being in an unassociated state with the WLAN access point. The method 700 may further include, at 920, the selecting including making a selection of the at least one metric from a first one of the distinct sets based on the UE being in an active connection with the WLAN access point, and selecting the at least one metric from a second one of the distinct sets based on the UE being in an non-active connection with the WLAN access point. The method 700 may further include, at 930, defining the non-active connection as a connection that is one of: unassociated with the AP, associated with the AP but not sending data, or associated with the AP but not sending data above a threshold (i.e., too low throughput).

Figure 10:
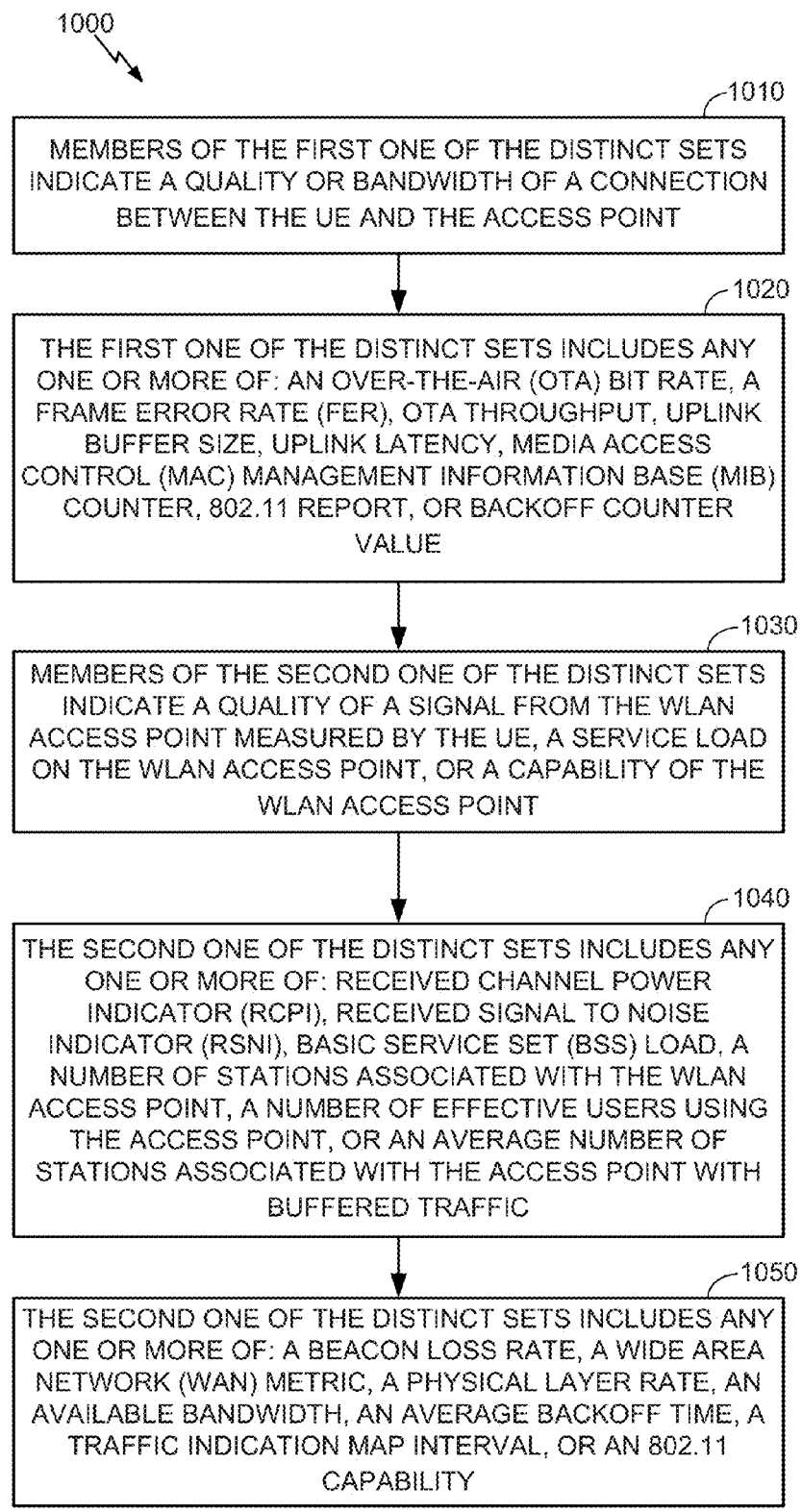

Referring to FIG. 10, the method 700 may include one or more of the additional operations 1000. For example, the method 700 may further include, at 1010, members of the first one of the distinct sets indicating a quality or bandwidth of a connection between the UE and the access point. For example, at 1020, the first one of the distinct sets may include any one or more of: an over-the-air (OTA) bit rate, a frame error rate (FER), OTA throughput, uplink buffer size, uplink latency, media access control (MAC) management information base (MIB) counter, 802.11 report, or backoff counter value. The first set may, in the alternative, exclude any one or more of the listed metrics.

Likewise, the method 700 may include, at 1030, members of the second one of the distinct sets indicating a quality of a signal from the WLAN access point measured by the UE, a service load on the WLAN access point, or a capability of the WLAN access point. For example, at 1040, the second one of the distinct sets may include any one or more of: received channel power indicator (RCPI), received signal to noise indicator (RSNI), basic service set (BSS) load, a number of stations associated with the WLAN access point, a number of effective users using the access point, or an average number of stations associated with the access point with buffered traffic. For further example, at 1050, the second one of the distinct sets may include any one or more of: a beacon loss rate, a wide area network (WAN) metric, a physical layer rate, an available bandwidth, an average backoff time, a traffic indication map interval, or an 802.11 capability. In the alternative, the second set may exclude any one or more of the listed metrics.

Figure 11:
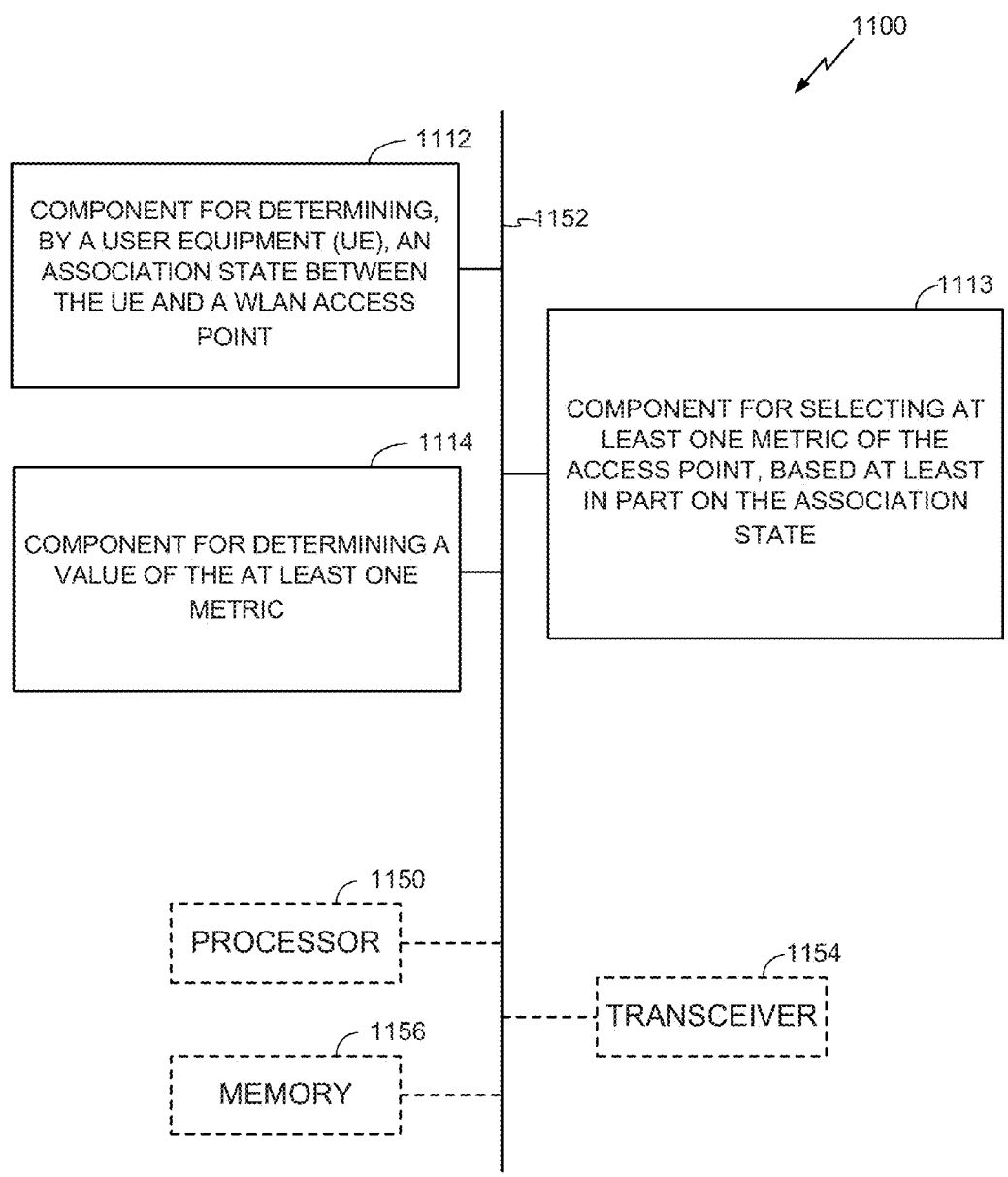
FIG. 11 illustrates a terminal apparatus for managing measuring and reporting of a metric for a WLAN, according to the methodology of FIG. 7.

In accordance with one or more aspects of the embodiments described herein, there are provided devices and apparatuses for managing WLAN measurement and reporting, as described above with reference to FIGS. 7-10. With reference to FIG. 11, there is provided an exemplary apparatus 1100 that may be configured as a wireless device, or as a processor or similar device/component for use within. The apparatus 1100 may include functional blocks that can represent functions implemented by a processor, software, or combination thereof (e.g., firmware). For example, apparatus 1100 may include an electrical component, module or means 1112 for determining, by a user equipment (UE), an association state between the UE and a WLAN access point. Said means may include a processor executing a more detailed algorithm, for example as described in connection with FIGS. 7-10, for performing the determining operation.

The apparatus 1100 may include a component, module or means 1113 for selecting at least one metric of the access point, based at least in part on the association state. Said means may include a processor executing a more detailed algorithm, for example as described in connection with FIGS. 7-10, for performing the selecting operation.

The apparatus 1100 may include a component, module or means 1114 for determining a value of the at least one metric. Said means may include a processor executing a more detailed algorithm, for example as described in connection with FIGS. 7-10, for performing the second determining operation.

In related aspects, the apparatus 1100 may optionally include a processor component 1150 having at least one processor, in the case of the apparatus 1100 configured as a wireless device (e.g., mobile entity, a UE, access terminal, or the like), rather than as a processor. The processor 1150, in such case, may be in operative communication with the components 1112-1114 via a bus 1152 or similar communication coupling. The processor 1150 may effect initiation and scheduling of the processes or functions performed by electrical components 1112-1114.

In further related aspects, the apparatus 1100 may include a transceiver component 1154 (radio/wireless or wired). A stand alone receiver and/or stand alone transmitter may be used in lieu of or in conjunction with the transceiver 1154. The apparatus 1100 may optionally include a component for storing information, such as, for example, a memory device/component 1156. The computer readable medium or the memory component 1156 may be operatively coupled to the other components of the apparatus 1100 via the bus 1152 or the like. The memory component 1156 may be adapted to store computer readable instructions and data for effecting the processes and behavior of the components 1112-1114, and subcomponents thereof, or the processor 1150, or the methods disclosed herein. The memory component 1156 may retain instructions for executing functions associated with the components 1112-1114. While shown as being external to the memory 1156, it is to be understood that the components 1112-1114 can exist within the memory 1156. It is further noted that the components in FIG. 11 may comprise processors, electronic devices, hardware devices, electronic subcomponents, logical circuits, memories, software codes, firmware codes, etc., or any combination thereof.

Figure 12:
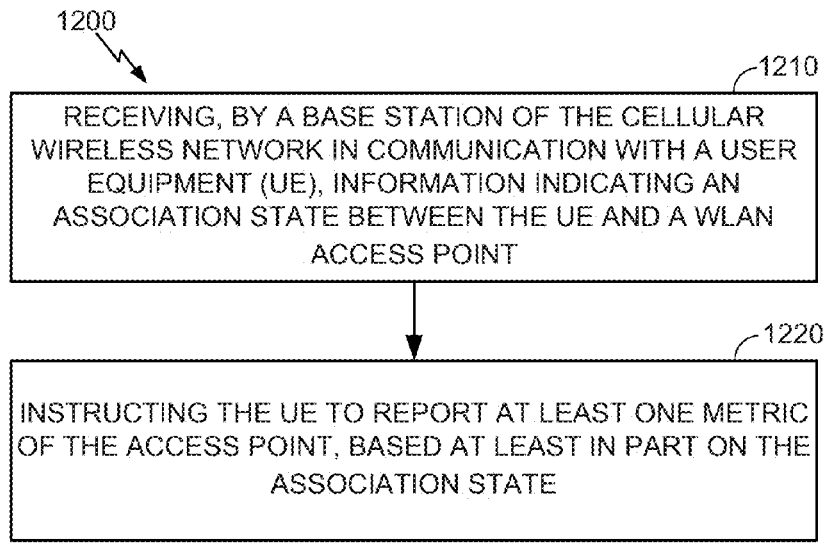

In accordance with one or more aspects of the embodiments described herein, with reference to FIG. 12, there is shown a methodology 1200, operable by a network entity (e.g., a BS, an eNB, or the like) for managing WLAN metric reporting by a UE or the like. Specifically, the method 1200 may involve, at 1210, receiving, by a base station of the cellular wireless network in communication with a user equipment (UE), information indicating an association state between the UE and a WLAN access point. In addition, the method 1200 may include, at 1220, the network entity instructing the UE to report at least one metric of the access point, based at least in part on the association state.

Figure 13:
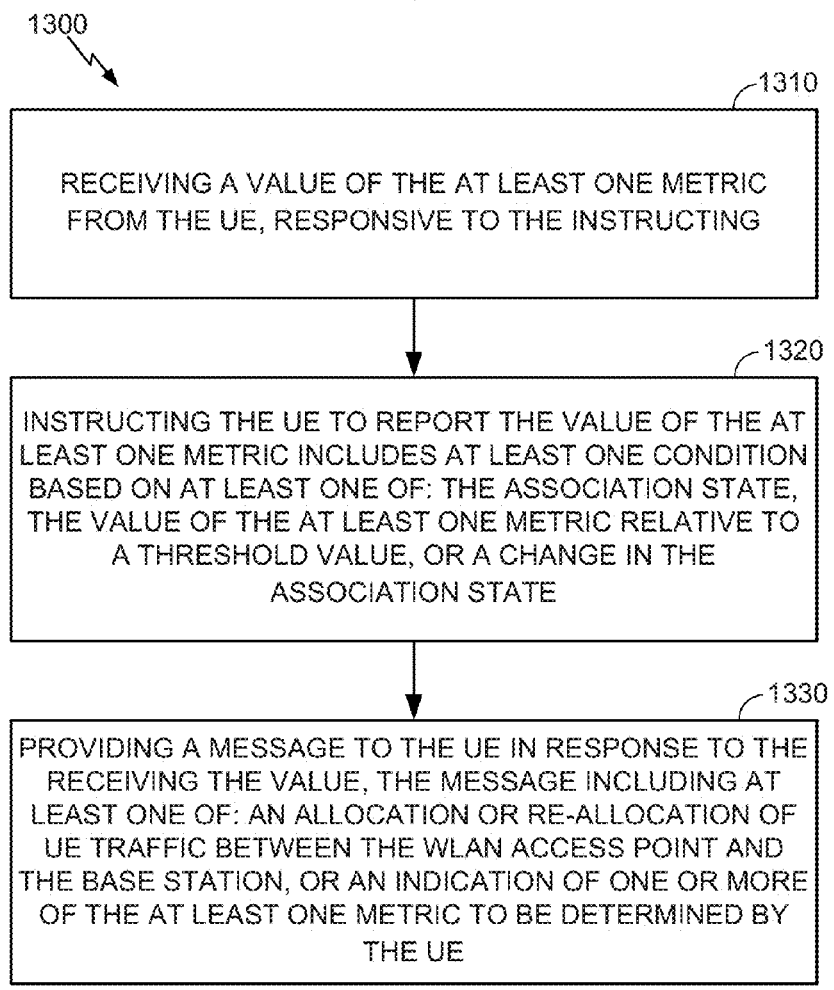
FIGS. 13-14 illustrate additional operations that may be included in the methodology illustrated by FIG. 12.
Figure 14:
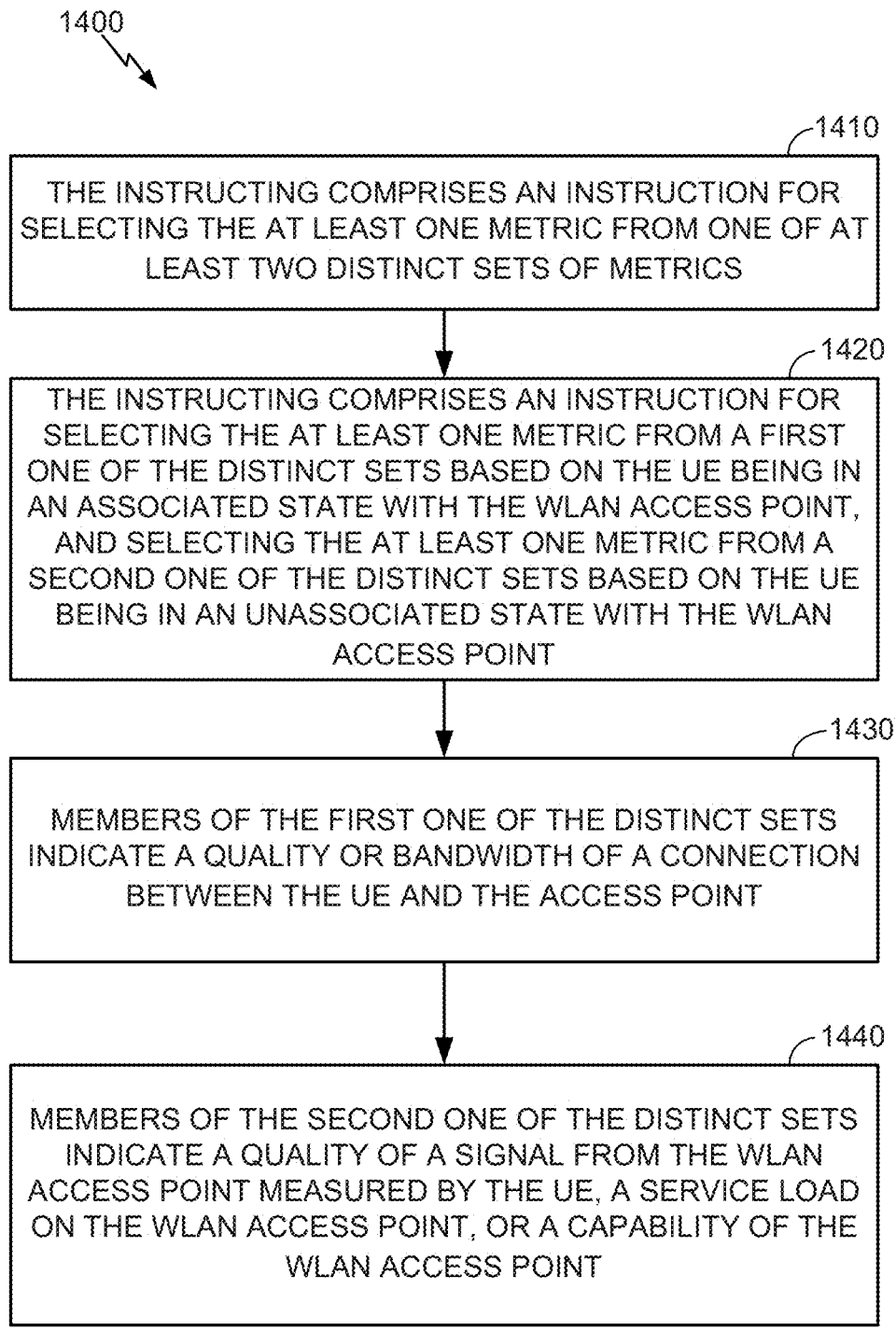

FIGS. 13-14 show further optional operations or aspects 1300-1400 that may be performed by the base station in conjunction with the method 1200 for managing WLAN reporting at a network entity of a wireless communications system. The operations shown in FIGS. 13-14 are not required to perform the method 1200. Operations 1300-1400 are independently performed and generally not mutually exclusive unless positioned on opposing branches from a block. Any one of such independent and not mutually exclusive operations may be performed regardless of whether another downstream or upstream operation is performed. If the method 1200 includes at least one operation of FIGS. 13-14, then the method 1200 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Referring to FIG. 13, the method 1200 may include one or more of the additional operations 1300. For example, the method 1200 may further include, at 1310, receiving a value of the at least one metric from the UE, responsive to the instructing. The method 1200 may further include, at 1320, instructing the UE to report the value of the at least one metric includes at least one condition based on at least one of: the association state, the value of the at least one metric relative to a threshold value, or a change in the association state.

In a related aspect, the method 1200 may include, at 1330, providing a message to the UE in response to the receiving the value, the message including at least one of: an allocation or re-allocation of UE traffic between the WLAN access point and the base station (e.g., informing the UE that certain traffic is or will be allocated to a different pathway), or an indication of one or more of the at least one metric to be determined by the UE. In the alternative, the message may exclude either or both of the described information elements.

Referring to FIG. 14, the method 1200 may include one or more of the additional operations 1400. For example, the method 1200 may further include, at 1410, the instructing including an instruction for selecting the at least one metric from one of at least two distinct sets of metrics. In addition, the method 1200 may further include, at 1420, the instructing including an instruction for selecting the at least one metric from a first one of the distinct sets based on the UE being in an associated state with the WLAN access point, and selecting the at least one metric from a second one of the distinct sets based on the UE being in an unassociated state with the WLAN access point.

In related aspects, the method 1400 may further include, at 1400, the members of the first one of the distinct sets indicating a quality or bandwidth of a connection between the UE and the access point. The method 1400 may further include, at 1440, the members of the second one of the distinct sets indicating a quality of a signal from the WLAN access point measured by the UE, a service load on the WLAN access point, or a capability of the WLAN access point.

Figure 15:
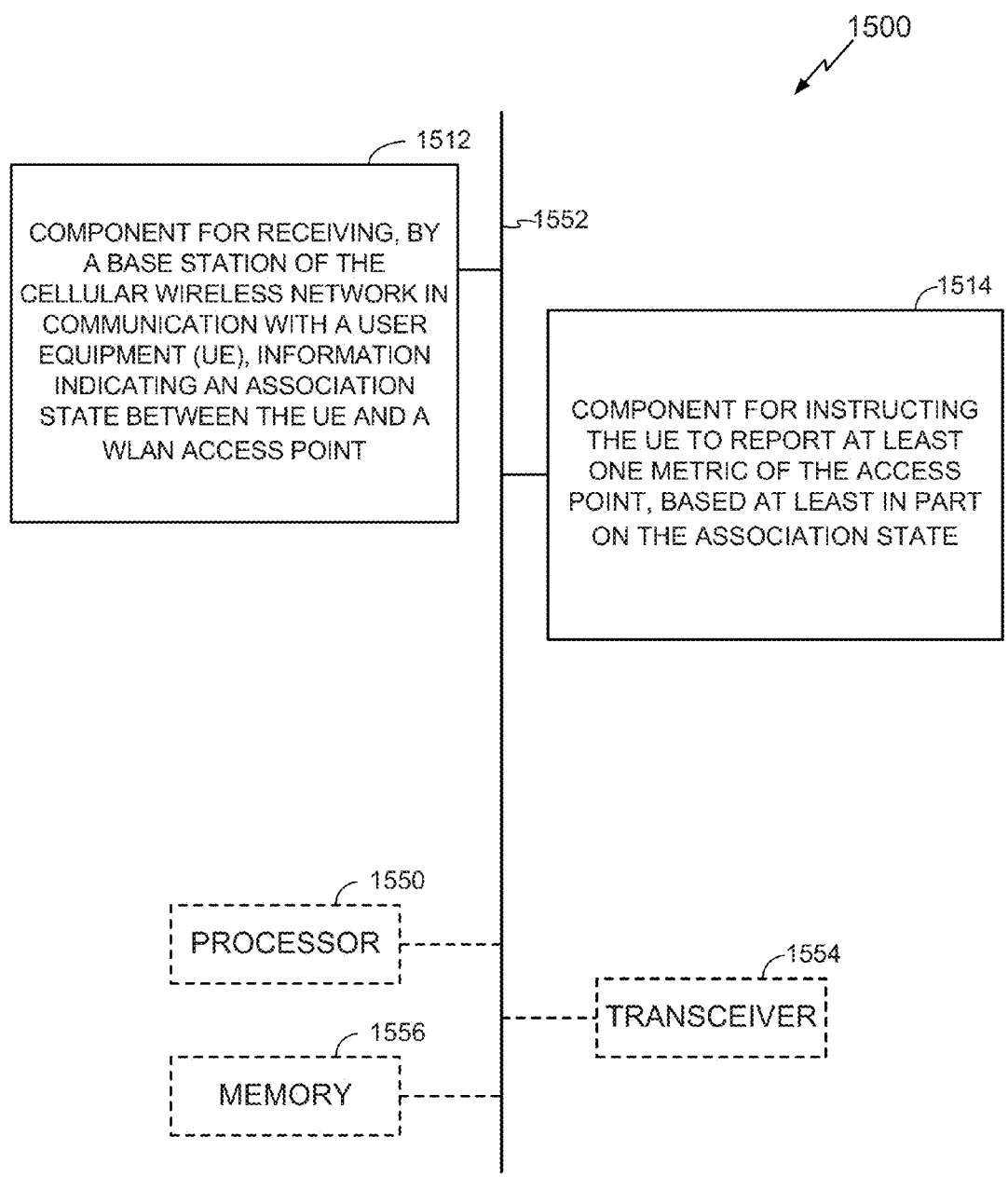
FIG. 15 illustrates a cellular access point apparatus for managing measuring and reporting of a metric for a WLAN, according to the methodology of FIG. 12.

In accordance with one or more aspects of the embodiments described herein, there are provided devices and apparatuses for management of WLAN metric reporting in an internetworked environment, as described above with reference to FIG. 12. With reference to FIG. 15, there is provided an exemplary apparatus 1500 that may be configured as a network entity, or as a processor or similar device/component for use within. The apparatus 1500 may include functional blocks that can represent functions implemented by a processor, software, or combination thereof (e.g., firmware). For example, apparatus 1500 may include an electrical component, module or means 1512 for receiving, by a base station of the cellular wireless network in communication with a user equipment (UE), information indicating an association state between the UE and a WLAN access point. Said means may include a processor performing a more detailed algorithm for receiving the association information, for example a call flow as shown in FIG. 6.

The apparatus 1500 may include an electrical component, module or means 1513 for transmitting at least one of DL data or an UL grant indicator to the mobile entity at a first time. Said means may include a processor performing a more detailed algorithm, for example transmitting DL data or an UL grant during a first discontinuous reception (DRX) on cycle.

The apparatus 1500 may include a component, module or means 1514 for instructing the UE to report at least one metric of the access point, based at least in part on the association state. Said means may include a processor performing a more detailed algorithm for determining an providing the instruction, for example as described in connection with FIGS. 13-14.

In related aspects, the apparatus 1500 may optionally include a processor component 1550 having at least one processor, in the case of the apparatus 1500 configured as a network entity (e.g., a BS, eNB, etc.), rather than as a processor. The processor 1550, in such case, may be in operative communication with the components 1512-1514 via a bus 1552 or similar communication coupling. The processor 1550 may effect initiation and scheduling of the processes or functions performed by electrical components 1512-1514.

In further related aspects, the apparatus 1500 may include a transceiver component 1554 (radio/wireless or wired). A stand alone receiver and/or stand alone transmitter may be used in lieu of or in conjunction with the transceiver 1554. The apparatus 1500 may optionally include a component for storing information, such as, for example, a memory device/component 1556. The computer readable medium or the memory component 1556 may be operatively coupled to the other components of the apparatus 1500 via the bus 1552 or the like. The memory component 1556 may be adapted to store computer readable instructions and data for effecting the processes and behavior of the components 1512-1514, and subcomponents thereof, or the processor 1550, or the methods disclosed herein. The memory component 1556 may retain instructions for executing functions associated with the components 1512-1514. While shown as being external to the memory 1556, it is to be understood that the components 1512-1514 can exist within the memory 1556. It is further noted that the components in FIG. 15 may comprise processors, electronic devices, hardware devices, electronic subcomponents, logical circuits, memories, software codes, firmware codes, etc., or any combination thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions that result in the outcome specified for the "determining" action. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and does not exclude any action not listed here, insofar as the action causes the specified outcome for the determining action.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth.

A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage medium may be any available non-transitory medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks hold data encoded magnetically, while discs hold data encoded optically.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication in a network comprising a cellular wireless network and a wireless local area network (WLAN), the method comprising:
   determining, by a user equipment (UE), an association state between the UE and a WLAN access point (AP);
   identifying, by the UE, a first set of metrics for a first type of state and a second, different set of metrics for a second type of state;
   selecting, by the UE, at least one metric of the WLAN AP based at least in part on the association state, wherein the at least one metric is selected from the first set of metrics when the association state indicates that the UE is in the first type of state with the WLAN AP or from the second set of metrics when the association state indicates that the UE is in the second type of state with the WLAN AP;
   determining, by the UE, a value of the at least one metric;
   reporting, by the UE, the value of the at least one metric to a base station of the cellular wireless network according to measurement procedures; and
   receiving, by the UE and based on reporting the value, a message that includes an indication of a metric, of the at least one metric, to be determined by the UE.

2. The method of claim 1, wherein the measurement procedures specify to report the value of the at least one metric to the base station of the cellular wireless network based on at least one of: the association state, the value of the at least one metric relative to a threshold value, a change in the association state, or receiving a reporting instruction from the base station.

3. The method of claim 1,
   wherein the first type of state is the UE being in an associated state with the WLAN AP, and
   wherein the second type of state is the UE being in an unassociated state with the WLAN AP.

4. The method of claim 1,
   wherein the first type of state is the UE being in an active connection with the WLAN AP, and
   wherein the second type of state is the UE being in a non-active connection with the WLAN AP.

5. The method of claim 4, wherein the non-active connection is one of: unassociated with the WLAN AP, associated with the WLAN AP but not sending data, or associated with the WLAN AP but not sending data above a threshold (i.e., too low throughput).

6. The method of claim 1, wherein members of the first set of metrics indicate a quality or bandwidth of a connection between the UE and the WLAN AP.

7. The method of claim 1, wherein the first set of metrics includes one or more of: an over-the-air (OTA) bit rate, a frame error rate (FER), an OTA throughput, an uplink buffer size, an uplink latency, a media access control (MAC) management information base (MIB) counter, an 802.11 report, or a backoff counter value.

8. The method of claim 1, wherein members of the second set of metrics indicate one or more of: a quality of a signal from the WLAN AP measured by the UE, a service load on the WLAN AP, or a capability of the WLAN AP.

9. The method of claim 1, wherein the second set of metrics includes one or more of: a received channel power indicator (RCPI), a received signal to noise indicator (RSNI), a basic service set (BSS) load, a number of stations associated with the WLAN AP, a number of effective users using the WLAN AP, or an average number of stations associated with the WLAN AP with buffered traffic.

10. The method of claim 1, wherein the second set of metrics includes one or more of: a beacon loss rate, a wide area network (WAN) metric, a physical layer rate, an available bandwidth, an average backoff time, a traffic indication map interval, or an 802.11 capability.

11. An apparatus for wireless communications, comprising:
   at least one processor configured to:
      determine an association state between the apparatus and a wireless local area (WLAN) access point (AP),
      identify a first set of metrics for a first type of state and a second, different set of metrics for a second type of state;
      select at least one metric of the WLAN AP based at least in part on the association state, wherein the at least one metric is selected from the first set of metrics when the association state indicates that the apparatus is in the first type of state with the WLAN AP or from the second set of metrics when the association state indicates that the apparatus is in the second type of state with the WLAN AP,
      determine a value of the at least one metric,
      report the value of the at least one metric to a base station of a cellular wireless network according to measurement procedures, and
      receive, based on reporting the value, a message that includes an indication of a metric, of the at least one metric, to be determined by the apparatus; and
   a memory coupled with the at least one processor.

12. The apparatus of claim 11, wherein the measurement procedures specify to report the value of the at least one metric to the base station of the cellular wireless network based on at least one of: the association state, the value of the at least one metric relative to a threshold value, a change in the association state, or receiving a reporting instruction from the base station.

13. The apparatus of claim 11,
   wherein members of the first set of metrics indicates a quality or bandwidth of a connection between the apparatus and the WLAN AP, and
   wherein members of the second set of metrics indicate a quality of a signal from the WLAN AP measured by the apparatus, a service load on the WLAN AP, or a capability of the WLAN AP.

14. A method for wireless communication in a network comprising a cellular wireless network and a wireless local area network (WLAN), the method comprising:
   receiving, by a base station of the cellular wireless network and from a user equipment (UE), a value for at least one metric of a WLAN access point (AP), wherein a first set of metrics for a first type of state and a second, different set of metrics for a second type of state are identified, and wherein the at least one metric is selected from the first set of metrics when the UE is in the first type of state with the WLAN AP or from the second set of metrics when the UE is in the second type of state with the WLAN AP;
   generating, by the base station and based on receiving the value of the at least one metric, a message that includes an indication of a metric, of the at least one metric, to be determined by the UE; and transmitting, by the base station, the message to the UE.

15. The method of claim 14, further comprising:

providing, to the UE, instructions for the UE to report the at least one metric,
wherein the instructions for the UE to report the value of the at least one metric includes at least one condition based on at least one of: an association state that indicates that the UE is in the first type of state with the WLAN AP or indicates that the UE is in the second type of state with the WLAN AP, the value of the at least one metric relative to a threshold value, or a change in the association state.

16. The method of claim 14, further comprising:

providing, to the UE, instructions for the UE to report the at least one metric,
wherein the instructions comprise instructions for selecting the at least one metric from one of the first set of metrics or the second set of metrics.

17. The method of claim 14, wherein the first type of state is the UE being in an associated state with the WLAN AP, and
wherein the second type of state is the UE being in an unassociated state with the WLAN AP.

18. The method of claim 14, wherein members of the first set of metrics indicate a quality or bandwidth of a connection between the UE and the WLAN AP.

19. The method of claim 14, wherein members of the second set of metrics indicate a quality of a signal from the WLAN AP measured by the UE, a service load on the WLAN AP, or a capability of the WLAN AP.

20. An apparatus for wireless communications in a cellular wireless network, comprising:

at least one processor configured to:
receive, from a user equipment (UE), a value for at least one metric of a wireless local area network (WLAN) access point (AP), wherein a first set of metrics for a first type of state and a second, different set of metrics for a second type of state are identified, and wherein the at least one metric is selected from the first set of metrics when the UE is in the first type of state with the WLAN AP or from the second set of metrics when the UE is in the second type of state with the WLAN AP,
generate, based on receiving the value of the at least one metric, a message that includes an indication of a metric, of the at least one metric, to be determined by the UE, and
transmit the message to the UE; and
a memory coupled with the at least one processor.

21. The apparatus of claim 20, wherein the at least one processor is further configured to provide instructions for the UE to report the at least one metric, and
wherein the instructions for the UE to report the value of the at least one metric include at least one condition based on at least one of: an association state that indicates that the UE is in the first type of state with the WLAN AP or indicates that the UE is in the second type of state with the WLAN AP, the value of the at least one metric relative to a threshold value, or a change in the association state.

22. The apparatus of claim 20, wherein members of the first set of metrics indicate a quality or bandwidth of a connection between the UE and the WLAN AP, and
wherein members of the second set of metrics indicate a quality of a signal from the WLAN AP measured by the UE, a service load on the WLAN AP, or a capability of the WLAN AP.

23. The apparatus of claim 20, wherein the first set of metrics and the second set of metrics include one or more common metrics, and
where the second set of metrics includes at least one other metric that is not included in the first set of metrics.

* * * * *